(12) United States Patent
Kikuchi

(10) Patent No.: US 9,877,246 B2
(45) Date of Patent: Jan. 23, 2018

(54) RADIO BASE STATION AND CONTROL METHOD THEREFOR

(71) Applicant: NEC Corporation, Minato-ku, Tokyo (JP)

(72) Inventor: Tsuneyuki Kikuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/324,060

(22) PCT Filed: Jun. 15, 2015

(86) PCT No.: PCT/JP2015/067115
§ 371 (c)(1),
(2) Date: Jan. 5, 2017

(87) PCT Pub. No.: WO2016/013329
PCT Pub. Date: Jan. 28, 2016

(65) Prior Publication Data
US 2017/0201916 A1    Jul. 13, 2017

(30) Foreign Application Priority Data

Jul. 25, 2014  (JP) ................................ 2014-151347

(51) Int. Cl.
*H04M 1/00*        (2006.01)
*H04W 36/04*      (2009.01)
(Continued)

(52) U.S. Cl.
CPC ........... *H04W 36/04* (2013.01); *H04W 12/06* (2013.01); *H04W 36/16* (2013.01);
(Continued)

(58) Field of Classification Search
CPC ..... H04W 36/00; H04W 88/08; H04W 80/04; H04M 1/72519
(Continued)

(56) References Cited

U.S. PATENT DOCUMENTS 9,210,597 B2* 12/2015 Radulescu ............ H04W 24/04
2006/0130135 A1* 6/2006 Krstulich ............ H04L 12/4679
726/15
(Continued)

FOREIGN PATENT DOCUMENTS

WO    2014/165807 A1    10/2014

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), 3GPP TS 36.300, V9.5.0 (Sep. 2010), pp. 1-172.
(Continued)

*Primary Examiner* — Danh Le

(57) ABSTRACT

A radio base station (10) of the present invention comprises: a determination unit (101) that determines whether to perform an off-the-air of a cell (11) managed by the local radio base station (10); a communication unit (102) that communicates with the other radio base stations (10) managing peripheral cells and with a communication provider apparatus (20) managing the bearer information of a user terminal (2); and a communication control unit (103). When it is determined that the off-the-air of the cell of the local radio base station (10) is to be performed, the communication control unit (103) transmits, to the other radio base stations (10) managing the peripheral cells, the authentication code of the user terminal (2) existing in the cell of the local radio base station (10). When a reconnection request is received from the user terminal (2), the communication control unit (103) determines, on the basis of authentication codes received from the other radio base stations (10), whether to authenticate the reconnection request. If the reconnection request is to be authenticated, the communication control unit (103) acquires, from the management apparatus (20),
(Continued)

the bearer information of the user terminal having transmitted the reconnection request, and establishes, on the basis of the acquired bearer information, a connection with the user terminal having transmitted the reconnection request.

7 Claims, 4 Drawing Sheets

(51) Int. Cl.
  *H04W 12/06* (2009.01)
  *H04W 36/16* (2009.01)
  *H04W 88/08* (2009.01)
  *H04W 92/20* (2009.01)
  *H04W 76/02* (2009.01)
  *H04W 52/02* (2009.01)
(52) U.S. Cl.
  CPC ..... *H04W 52/0206* (2013.01); *H04W 76/027* (2013.01); *H04W 88/08* (2013.01); *H04W 92/20* (2013.01)
(58) Field of Classification Search
  USPC ............. 455/436, 550.1, 561; 370/331
  See application file for complete search history.

(56) References Cited

U.S. PATENT DOCUMENTS

| | | | | |
|---|---|---|---|---|
| 2006/0226950 | A1* | 10/2006 | Kanou | G06F 21/10 340/5.61 |
| 2008/0014938 | A1* | 1/2008 | Hart | H04W 76/04 455/435.1 |
| 2008/0137853 | A1* | 6/2008 | Mizikovsky | H04L 9/0836 380/247 |
| 2011/0040862 | A1* | 2/2011 | Nakajima | H04L 12/2836 709/223 |
| 2011/0111731 | A1* | 5/2011 | Iwamura | H04W 12/08 455/410 |
| 2013/0010728 | A1* | 1/2013 | Oguchi | H04W 60/00 370/329 |
| 2013/0246641 | A1* | 9/2013 | Vimpari | H04L 47/10 709/228 |
| 2014/0325041 | A1* | 10/2014 | Xu | H04L 41/0816 709/221 |
| 2015/0156686 | A1* | 6/2015 | Kikuchi | H04W 36/08 455/437 |
| 2017/0034684 | A1* | 2/2017 | Yasuda | H04W 8/005 |

OTHER PUBLICATIONS

3rd Generation Partnership Project; Technical Specification Group Radio Access Network; Energy Saving Enhancements Study—Solution Evaluations and Way Forward, NEC Corporation, 3GPP TSG-RAN WG3#82, R3-132157, San Francisco, USA, Nov. 11-15, 2013, pp. 1-7.

3rd Generation Partnership Project; Technical Specification Group Radio Access Network; Evolved Universal Terrestrial Radio Access (E-UTRA); Potential solutions for energy saving for E-UTRAN (Release 11), 3GPP TR 36.927, V11.0.0 (Sep. 2012), pp. 1-22.

International Search Report for PCT Application No. PCT/JP2015/067115, dated Aug. 11, 2015.

English translation of Written opinion for PCT Application No. PCT/JP2015/067115.

* cited by examiner

Fig. 5

| INFORMATION ELEMENT | DESCRIPTION |
| --- | --- |
| UE-ID | IDENTIFIER OF UE IN COMMUNICATING/NON-COMMUNICATING STATE |
| TL-ID | NETWORK ADDRESS OF TELECOMMUNICATIONS CARRIER APPARATUS |
| MME-UE-S1AP-ID | CONNECTION IDENTIFIER (CAPTURING TELECOMMUNICATIONS CARRIER SIDE) |
| eNB-UE-S1AP-ID | CONNECTION IDENTIFIER (CAPTURING RADIO BASE STATION SIDE) |
| Authentication Code | AUTHENTICATION CODE OF UE |
| ... | REPEAT PER UE |

RADIO BASE STATION AND CONTROL METHOD THEREFOR

This application is a National Stage Entry of PCT/JP2015/067115 filed on Jun. 15, 2015, which claims priority from Japanese Patent Application 2014-151347 filed on Jul. 25, 2014, the contents of all of which are incorporated herein by reference, in their entirety.

TECHNICAL FIELD

The present invention relates to a radio base station and a control method therefor.

BACKGROUND ART

As described in NPL 1, a technology called Energy Saving is standardized in order to reduce power consumption in the mobile communication system of the LTE (Long Term Evolution) system. Energy Saving is a technology for reducing power consumption by suppressing transmission power of radio base stations or stopping signal transmission (stopping radio transmission) in cells where existing user equipment (UE) is less or traffic is light.

CITATION LIST

Non Patent Literature

NPL 1: 3GPP TS 36. 300 v9. 5. 0 section 22. 4. 4

SUMMARY OF INVENTION

Technical Problem

Performing a reconnection is thought of as a method for providing communication service after radio transmission is stopped for UE that exists in a cell where the radio transmission will be stopped and is provided with the communication service. The reconnection is a process for establishing a connection again when a failure occurs with a connection between the UE and a radio base station or a handover fails. In this method, when the connection with the radio base station managing the cell is cut along with the stop of the radio transmission to the cell, the UE transmits a reconnection request to a radio base station managing a cell (a peripheral cell) around the cell where the radio transmission has been stopped. The radio base station that has received the reconnection request from the UE establishes a connection with the UE if the radio base station retains a UE context that is information on that UE.

The UE context includes, for example, an authentication code for authenticating the reconnection request from the UE, information on a bearer configured on the UE (bearer information) and the like. The radio base station that has received the reconnection request from the UE determines whether or not to authenticate the reconnection request based on the authentication code included in the UE context of that UE. Then, when the radio base station that has received the reconnection request authenticates the reconnection request, the radio base station configures a bearer to the UE and establishes a connection with the UE based on the bearer information included in the UE context. At that time, the radio base station that has received the reconnection request from the UE does not authenticate the reconnection request if the radio base station does not retain the authentication code of the UE. In this case, it takes time to establish the connection and it is delayed to provide communication service because the process for establishing the connection has to start from the beginning.

Information included in a UE context is retained, for example, by a radio base station to which UE has connected. Therefore, in the case of stopping radio transmission to a cell, transmitting a UE context including various information, such as an authentication code and bearer information of UE existing in the cell, from a radio base station managing the cell where the radio transmission is stopped to a radio base station managing a peripheral cell is considered for enabling the UE existing in the cell to reconnect. However, if all the information as described above on all UE existing in that cell is transmitted and received between radio base stations, exchanges of a large amount of information occur between specific radio base stations for a short term to increase system loads.

An object of the present invention is to provide a base station and a control method therefor, which can provide communication service for UE existing in a cell without delay with suppressing increase in system loads when radio transmission to that cell is stopped.

Solution to Problem

In order to achieve the object described above, a radio base station, according to the present invention, comprises: a determination unit for determining whether or not to stop radio transmission to a cell managed by the radio base station; a communication unit for communicating with another radio base station managing a peripheral cell of the cell and a management apparatus managing bearer information that is information on a bearer configured for user equipment; and a communication control unit for transmitting an authentication code of user equipment existing in the cell and establishing a connection with the radio base station to a radio base station managing the peripheral cell through the communication unit upon decision of stopping the radio transmission to the cell, determining whether or not to authenticate a reconnection request based on an authentication code transmitted from another radio base station upon receipt of the reconnection request from user equipment, acquiring, from the management apparatus through the communication unit, bearer information on the user equipment having transmitted the reconnection request in a case of authenticating the reconnection request, and establishing a connection with the user equipment having transmitted the reconnection request based on the acquired bearer information.

In order to achieve the object described above, a method of controlling a radio base station, according to the present invention, comprises: determining whether or not to stop radio transmission to a cell managed by the radio base station; transmitting an authentication code of user equipment existing in the cell and establishing a connection with the radio base station to a radio base station managing the peripheral cell upon decision of stopping the radio transmission to the cell; and determining whether or not to authenticate a reconnection request based on an authentication code transmitted from another radio base station upon receipt of the reconnection request from user equipment, acquiring bearer information on the user equipment having transmitted the reconnection request from a management apparatus managing bearer information that is information on a bearer configured for user equipment in a case of authenticating the reconnection request, and establishing a connection with the user equipment having transmitted the reconnection request based on the acquired bearer information.

Advantageous Effects of Invention

According to the present invention, communication service can be provided for UE existing in a cell without delay with suppressing increase in system loads when radio transmission to that cell is stopped.

BRIEF DESCRIPTION OF DRAWINGS

FIG. 5 is a diagram showing a structure example of a context saving request transmitted by the radio base station shown in FIG. 1.

DESCRIPTION OF EMBODIMENTS

Exemplary embodiments of the present invention are described below with reference to the drawings.

Figure 1:
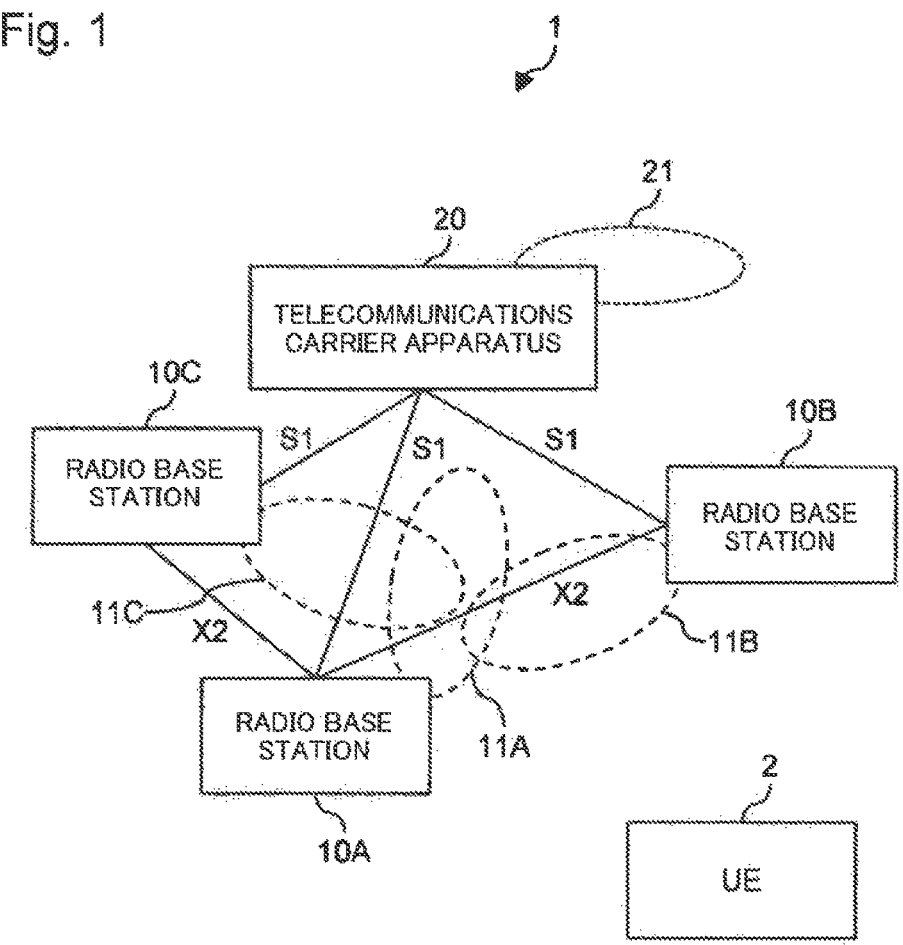
FIG. 1 is a diagram showing a structure of a mobile communication system according to one exemplary embodiment of the present invention.

FIG. 1 is a diagram showing a structure of a mobile communication system 1 according to one exemplary embodiment of the present invention.

The mobile communication system 1 shown in FIG. 1 comprises user equipment (UE) 2, a plurality of radio base stations 10 (10A, 10B, and 10C), and a telecommunications carrier apparatus 20. The telecommunications carrier apparatus 20 is one example of a management apparatus.

The UE 2 is a communication terminal that has a function of performing radio communication with the radio base stations 10.

A radio base station 10 manages a cell 11 specifying a range of enabling radio communication and performs radio communication with UE 2 existing in the cell 11 managed by the radio base station 10. The radio base station 10 also communicates with the other radio base stations 10 through an X2 interface and communicates with the telecommunications carrier apparatus 20 through an S1 interface.

The telecommunications carrier apparatus 20 is a management apparatus for managing communication of the UE 2. The telecommunications carrier apparatus 20 configures and releases a bearer of the UE 2, manages a location of the UE 2, and performs user authentication, QoS (Quality of Service) control and the like.

Next, a structure of the radio base station 10 is explained. It is noted that explanations of structures of the UE 2 and the telecommunications carrier apparatus 20 are omitted because the structures of the UE 2 and the telecommunications carrier apparatus 20 are well known to those skilled in the art and also not directly related to the present invention.

Figure 2:
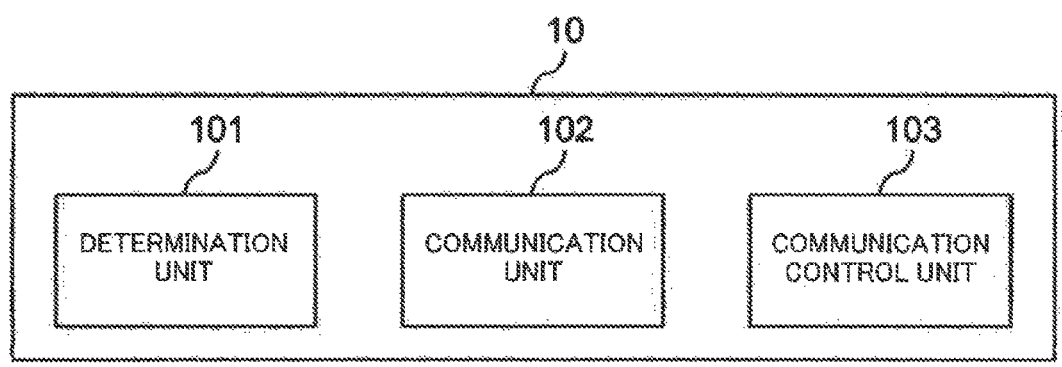
FIG. 2 is a block diagram showing a structure of main units of a radio base station shown in FIG. 1.

FIG. 2 is a block diagram showing a structure of main units of the radio base station 10. It is noted that descriptions of a structure and the like for the radio base station 10 to perform radio communication with the UE 2 are omitted in FIG. 2.

The radio base station 10 shown in FIG. 2 comprises a determination unit 101, a communication unit 102, and a communication control unit 103.

The determination unit 101 determines whether or not to stop radio transmission to the cell 11 managed by the radio base station 10.

The communication unit 102 communicates with the other radio base stations 10 through the X2 interface and communicates with the telecommunications carrier apparatus 20 through the S1 interface.

The communication control unit 103 controls communication of the UE 2 existing in the cell 11. For example, the communication control unit 103 transmits the authentication code of the UE 2 existing in the cell 11 and establishing a connection with the radio base station 10 to the radio base station 10 managing a peripheral cell through the communication unit 102 when it is decided to stop the radio transmission to the cell 11.

Also, when the communication control unit 103 receives a reconnection request from the UE 2, the communication control unit 103 determines whether or not to authenticate that reconnection request based on the authentication code transmitted by another radio base station 10. When the reconnection request is authenticated, the communication control unit 103 establishes a connection by establishing an RRC (Radio Resource Control) connection with the UE 2 and configuring a bearer to the UE 2. At that time, the communication control unit 103 acquires bearer information of that UE 2 from the telecommunications carrier apparatus 20 through the communication unit 102 and configures the bearer to the UE 2 based on the acquired bearer information.

Next, operations of the mobile communication system 1 are explained.

Figure 3:
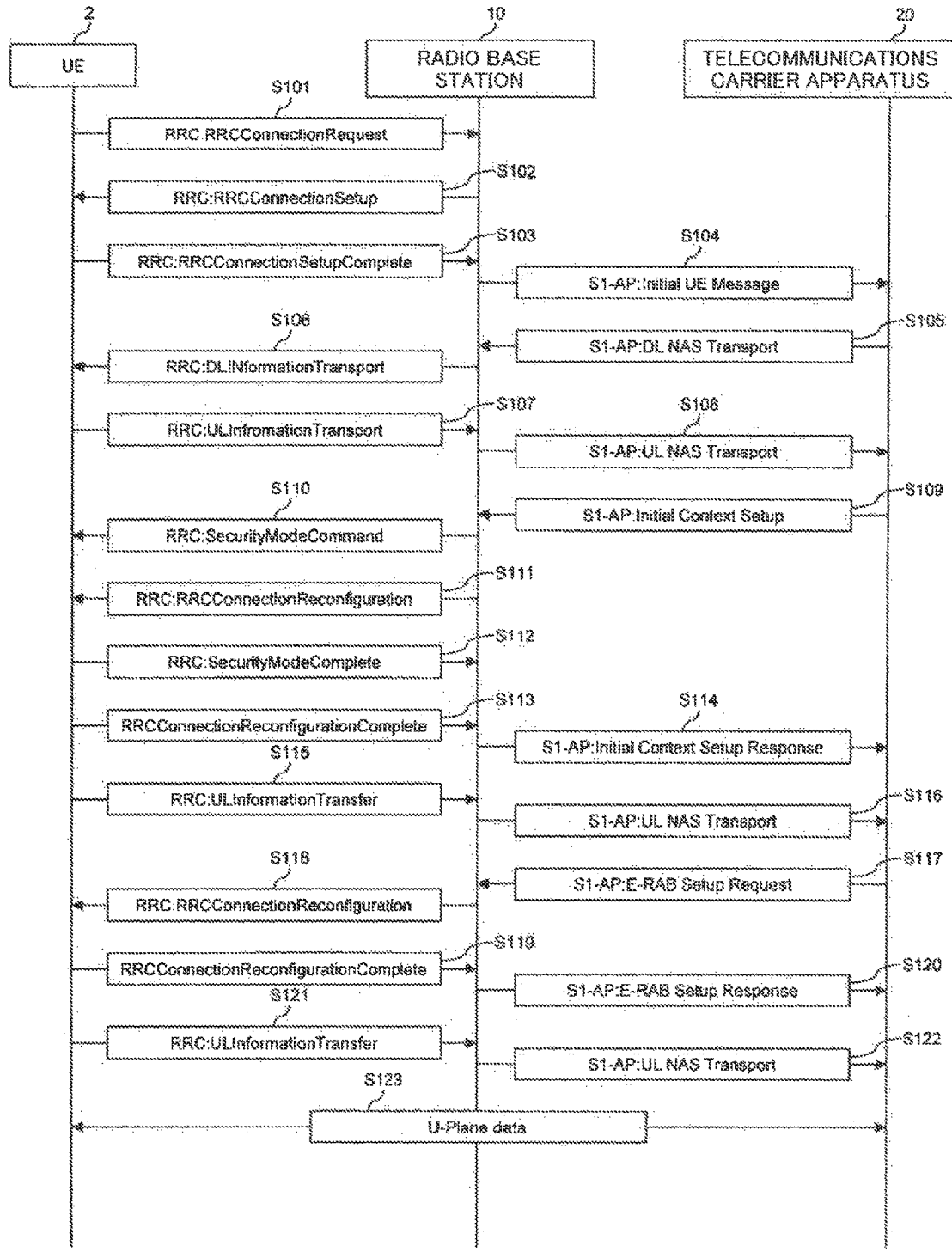
FIG. 3 is a sequence diagram showing an operation of establishing a connection among UE, a radio base station and a telecommunications carrier apparatus in the mobile communication system shown in FIG. 1.

Firstly, an operation for establishing the connection between the UE 2 and the radio base station 10 in the mobile communication system 1 is explained with reference to the sequence diagram shown in FIG. 3. It is noted that detailed explanations on procedures shown in FIG. 3 for establishing the connection between the UE 2 and the radio base station 10 are omitted because the procedures are standardized in 3GPP (3rd Generation Partnership Project).

First, the UE 2 transmits an RRCConnectionRequest to the radio base station 10 (step S101). When the radio base station 10 receives the RRCConnectionRequest, the radio base station 10 transmits an RRCConnectionSetup to the UE 2 (step S102). When the UE 2 receives the RRCConnectionSetup, the UE 2 transmits an RRCConnectionSetupComplete to the radio base station 10 (step S103). The processes from step S101 to step S103 described above are a procedure for setting up an RRC connection.

When the radio base station 10 receives the RRCConnectionSetupComplete, the radio base station 10 transmits an Initial UE Message to the telecommunications carrier apparatus 20 (step S104). When the telecommunications carrier apparatus 20 receives the Initial UE Message, the telecommunications carrier apparatus 20 transmits a DL NAS Transport to the radio base station 10 (step S105). When the radio base station 10 receives the DL NAS Transport, the radio base station 10 transmits a DLInformationTransport to the UE 2 (step S106). When the UE 2 receives the DLInformationTransport, the UE 2 transmits a ULInformationTransport to the radio base station 10 (step S107). When the radio base station 10 receives the ULInformationTransport, the radio base station 10 transmits a NAS Transport to the telecommunications carrier apparatus 20 (step S108). The processes from step S104 to step S108 described above are a procedure for setting up an S1 Connection.

When the telecommunications carrier apparatus 20 receives the NAS Transport, the telecommunications carrier apparatus 20 transmits an Initial ContextSetup to the radio base station 10 (step S109). When the radio base station 10 receives the Initial ContextSetup, the radio base station 10 transmits a SecurityModeCommand to the UE 2 (step S110). The radio base station 10 also transmits an RRCConnectionReconfiguration to the UE 2 (step S111). When the UE 2 receives the SecurityModeCommand, the UE 2 transmits a SecurityModeComplete to the radio base station 10 (step S112). Also, when the UE 2 receives the RRCConnectionReconfiguration, the UE 2 transmits an RRCConnectionReconfigurationComplete to the radio base station 10 (step S113). When the radio base station 10 receives the RRCConnectionReconfigurationComplete, the radio base station 10 transmits an Initial Context Setup Response to the telecommunications carrier apparatus 20. The processes from step S109 to step S114 described above are a procedure for setting up a default bearer and acquiring an authentication code.

Next, the UE 2 transmits a ULInformationTransfer to the radio base station 10 (step S115). When the radio base station 10 receives the ULInformationTransfer, the radio base station 10 transmits a UL NAS Transport to the telecommunications carrier apparatus 20 (step S116). When the telecommunications carrier apparatus 20 receives the UL NAS Transport, the telecommunications carrier apparatus 20 transmits an E-RAB Setup Request to the radio base station 10 (step S117). When the radio base station 10 receives the E-RAB Setup Request, the radio base station 10 transmits an RRCConnectionReconfiguration to the UE 2 (step S118). When the UE 2 receives the RRCConnectionReconfiguration, the UE 2 transmits an RRCConnectionReconfigurationComplete to the radio base station 10 (step S119). When the radio base station 10 receives the RRCConnectionReconfigurationComplete, the radio base station 10 transmits an E-RAB Setup Response to the telecommunications carrier apparatus 20 (step S120). Also, the UE 2 transmits a ULInformationTransfer to the radio base station 10 (step S121). When the radio base station 10 receives the ULInformationTransfer, the radio base station 10 transmits a UL NAS Transport to the telecommunications carrier apparatus 20 (step S122). The processes from step S115 to step S122 described above are a procedure for starting service. Especially, the processes from step S117 to step S120 described above are a procedure for setting up a bearer for the service.

Through the processes described above, the User-Plane where user data is transmitted and received conducts between the UE 2 and the telecommunications carrier apparatus 20 (step S123).

Figure 4:
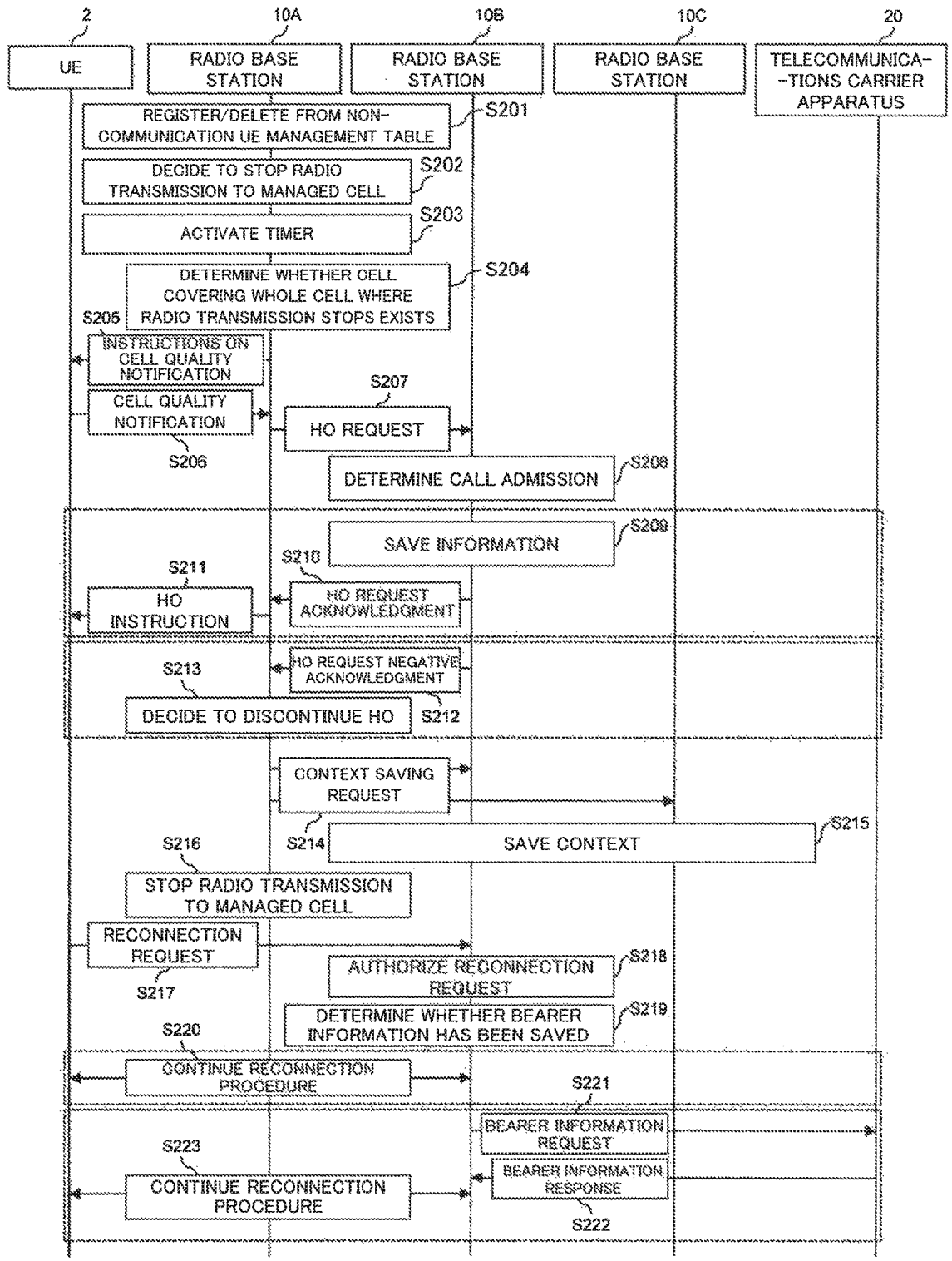
FIG. 4 is a sequence diagram showing an operation of stopping radio transmission to a cell in the mobile communication system shown in FIG. 1.

Next, an operation of stopping radio transmission to a cell in the mobile communication system 1 is explained with reference to the sequence diagram shown in FIG. 4. It is noted that a case of stopping radio transmission to a cell 11A is explained as an example below. In addition, as descried in FIG. 1, there shall be a cell 11B managed by a radio base station 10B and a cell 11C managed by a radio base station 10C as peripheral cells of the cell 11A in the explanation below.

The communication control unit 103 of a radio base station 10A (a communication control unit 103A) monitors a communication state of UE 2 existing in the cell 11A and detects UE 2 in a non-communication state that is a state where a connection with the radio base station 10A is established but packets do not flow through a configured bearer (there is no Userplane data).

The communication control unit 103 retains a non-communication UE management table managing UE 2 in a non-communication state, and registers the UE 2 on the non-communication UE management table and deletes the UE 2 from the non-communication UE management table (step S201). Specifically, when the communication control unit 103 detects the UE 2 in the non-communication state, identification information on such UE 2 is registered on the top of the non-communication UE management table. When the UE 2 registered on the non-communication UE management table starts communication again (transmitting and receiving data (packets)), the communication control unit 103 deletes such UE 2 from the non-communication UE management table. When a predetermined time has passed since the registration of the UE 2 on the non-communication UE management table, the communication control unit 103 considers that the UE 2 does not intend to be provided with communication service and disconnects that UE 2.

If the number of pieces of UE 2 existing in the cell 11A is equal to or less than a predetermined threshold, or traffic in the cell 11A is equal to or less than a predetermined threshold, the determination unit 101 of the radio base station 10A (a determination unit 101A) decides to stop the radio transmission to the cell 11A (step S202). It is noted that the determination unit 101A may decide to stop the radio transmission to the cell 11A, triggered by receiving a stop request for stopping the radio transmission to the cell 11A from an operator terminal not shown, or by reaching a preset time.

When the determination unit 101A decides to stop the radio transmission to the cell 11A, the determination unit 101A activates a timer for counting the remaining time of a preparation period for stopping the radio transmission until a time of stopping the radio transmission to the cell 11A (step S203). When the timer expires, the determination unit 101A notifies the communication control unit 103A of completion of the preparation period for stopping the radio transmission.

When stopping the radio transmission to the cell 11A is decided, the communication control unit 103A confirms whether there is a cell covering the whole cell 11A based on station data indicating a coverage of a cell managed by each radio base station 10 and information acquired from peripheral radio base stations 10 (step S204).

If there is no cell covering the whole cell 11A, the communication control unit 103A transmits to communicating UE 2 an instruction on cell quality notification for measuring radio quality of peripheral cells of the cell 11A and reporting a cell whose measured radio quality is more than a predetermined threshold (step S205).

The UE 2 receiving the instruction on cell quality notification measures radio quality of the peripheral cells and transmits to the radio base station 10A a cell quality notification indicating a cell whose measured radio quality is more than the predetermined threshold (step S206).

The communication control unit 103A decides that the cell, indicated in the cell quality notification from the UE 2, is a handover destination cell of that UE 2. It is noted that if there is a cell covering the whole cell 11A on step S204, the communication control unit 103A decides such cell as the handover destination cell.

When the communication control unit 103A decides the handover destination cell of the UE 2, the communication control unit 103A transmits a handover (HO: HandOver) request for handing over that UE 2 to the radio base station 10 managing the cell that has been decided as the handover destination (step S207). The HO request includes an ID of the handover destination cell (a cell ID), an ID of the UE 2 requesting a handover, information for continuing to provide communication service for that UE 2 in the handover destination cell, an authentication code of that UE 2, and the like. The information for continuing to provide the communication service for the UE 2 includes connection information between the radio base station 10A and the telecommunications carrier apparatus 20, bearer information on a bearer configured between the UE 2 and the telecommunications carrier apparatus 20, capacity information of the UE 2, security information on a radio section, and the like.

It is noted that when the communication control unit 103A ends requesting the handover of communicating UE 2, the communication control unit 103A may request a handover for UE 2, in ascending order according to the length of time that has elapsed since a beginning of the non-communication state, in the UE 2 registered on the non-communication UE management table until the communication control unit 103A is notified of the completion of a preparation period for stopping the radio transmission. Also, if a plurality of cells whose radio quality is more than the predetermined threshold are reported from the UE 2, the communication control unit 130A may concurrently transmit HO requests to radio base stations managing each cell.

In the following, an HO request for the UE 2 shall be transmitted to the radio base station 10B.

When the communication control unit 103 of the radio base station 10B (a communication control unit 103B) receives an HO request for the UE 2, the communication control unit 103B determines a call admission of that UE 2 based on the used resource amount and traffic in a cell indicated by a cell ID included in the HO request and bearer information on the UE 2 (step S208).

When the communication control unit 103B determines that the call admission of the UE 2 is possible, the communication control unit 103B saves information, included in the HO request, for continuing to provide communication service for the UE 2 (step S209). Then, the communication control unit 103B transmits an HO request acknowledgment indicating that the call admission of the UE 2 is possible to the radio base station 10A (step S210). The HO request acknowledgment includes bearer information on a radio section and security information on the radio section.

When the communication control unit 103A receives the HO request acknowledgment of the UE 2, the communication control unit 103A transmits an HO instruction to the UE 2 for instructing the UE 2 to perform the handover to a cell decided as a handover destination cell (step S211). The HO instruction includes bearer information of a radio section and security information of the radio section, which are included in an HO request acknowledgment. It is noted that if the communication control unit 103A concurrently transmits HO requests to a plurality of radio base stations, the communication control unit 103A instructs the UE 2 on a handover to, for example, a cell managed by a radio base station that has transmitted an HO request acknowledgment first.

The UE 2 receiving the HO instruction performs the handover to the cell indicated by the HO instruction. For the communicating UE 2, the handover allows communication service to be provided for such UE 2 without interruption. Also, it is assumed that the UE 2 with a long elapsed time after starting the non-communication state does not intend to be provided with communication service (it is unlikely to be provided with communication service shortly). On the other hand, the UE 2 with a short elapsed time after starting the non-communication state is considered likely to be provided with communication service shortly. Therefore, a UE is provided the communication service without delay when the UE that is likely to be provide the communication service actually tries to be provided the communication service due to the handover of each UE is performed in ascending order according to the length of time that has elapsed since a beginning of the non-communication state.

When the communication control unit 103B determines that the call admission of the UE 2 is not possible, the communication control unit 103B transmits an HO request negative acknowledgment indicating that the call admission of the UE 2 is not possible to the radio base station 10A (step S212).

When the communication control unit 103A receives the HO request negative acknowledgment of the UE 2, the communication control unit 103A decides to discontinue the handover of that UE 2 (step S213). It is noted that if the communication control unit 103A concurrently transmits HO requests to a plurality of radio base stations, the communication control unit 103A may wait to decide discontinuing the handover until the receipt of HO request negative acknowledgments from all the radio base stations to which the HO requests are transmitted or the notification of completing preparation periods for stopping radio transmission. It is noted that the communication control unit 103A may ask (negotiate with) radio base stations managing the peripheral cells to expand the cells until the determination unit 101 notifies the communication control unit 103A of the completion of the preparation periods for stopping radio transmission.

When the communication control unit 103A is notified of the completion of the preparation period for stopping the radio transmission, the communication control unit 103A transmits a context saving request for the UE 2 receiving the HO request negative acknowledgment and the UE 2 registered on the non-communication UE management table to the radio base stations 10B and 10C (step S214). The context saving request includes, as shown in FIG. 5, ID of the UE 2 (UE-ID), connection information between the UE 2 and the radio base station 10A and connection information between the UE 2 and the telecommunications carrier apparatus 20 (MME-UE-S1AP-ID and eNB-UE-S1AP-ID), and an authentication code of the UE 2. However, the context saving request does not include bearer information on the UE 2.

It is noted that, as described above, the communication control unit 103A may request a handover of the UE 2 registered on the non-communication UE management table following the communicating UE 2. In this case, the communication control unit 103A does not transmit a context saving request for the handed-over UE 2 in the UE 2 registered on the non-communication UE management table. It means that the communication control unit 103A transmits a context saving request for the UE 2 that has not handed over when the communication control unit 103A is notified of the completion of the preparation period for stopping the radio transmission.

Also, the communication control unit 103A may not transmit context saving requests for all UE 2 registered on the non-communication UE management table. For example, the communication control unit 103A may transmit context saving requests for the predetermined number of pieces of UE 2 in ascending order according to the length of time that has elapsed since the non-communication state started. The communication control unit 103A may also transmit a context saving request for the UE 2 whose elapsed time after starting the non-communication state is within a predetermined threshold. It is assumed that the UE 2 with a long elapsed time after starting the non-communication state is unlikely to tend to be provided with communication service and has little inconvenience from a disconnection. Therefore, avoiding transmitting the context saving request for such UE 2 can further reduce the amount of information transmitted and received between the radio base stations 10.

The communication control units 103 of the radio base stations 10B and 10C save the context saving request transmitted by the radio base station 10A for a predetermined period (step S215).

After transmitting the context saving request, the communication control unit 103A stops the radio transmission to the cell 11A (step S216). It is noted that in the case of stopping radio transmission to all the cells managed by the radio base stations 10, the radio base stations 10 may be turned off. This can reduce power consumption more.

When the radio transmission to the cell 11A is stopped, the UE 2 existing in the cell 11A and the radio base station 10A are disconnected. The UE 2 selects a cell to reconnect and transmits a reconnection request including an authentication code to a radio base station managing the selected cell (step S217). The following describes a case where the UE 2 transmits a reconnection request to the radio base station 10B as an example.

When the communication control unit 103B receives the reconnection request from the UE 2, the communication control unit 103B authenticates (authorizes) the reconnection request in the case that the authentication code included in the reconnection request is included in the context saving request received from the radio base station 10A. If the authentication code included in the reconnection request is not saved (not included in the context saving request), the communication control unit 103B does not authorize the reconnection request and starts a procedure for establishing a connection with the UE 2 from the beginning.

In this exemplary embodiment, the authentication code of the UE 2 that has not handed over to a peripheral cell upon stopping the radio transmission to the cell 11A is included in the context saving request and transmitted to the radio base stations 10 managing peripheral cells. This allows the radio base stations 10 receiving the reconnection request from the UE 2 that has not handed over to a peripheral cell upon stopping the radio transmission to the cell 11A to authenticate the reconnection request based on the authentication code included in the context saving request. Thus, the connection can be established rapidly to provide communication service without delay because it is not necessary to start the procedure for establishing a connection with the UE 2 from the beginning.

It is noted that if the UE 2 receiving an HO instruction fails to perform a handover, such UE 2 also transmits a reconnection request to a radio base station managing a handover destination cell. In this case, the radio base station 10 managing the handover destination cell can authenticate the reconnection request based on the authentication code included in such UE 2's HO request received from the radio base station 10A.

When the reconnection request from the UE 2 is authenticated, the communication control unit 103B determines whether or not to save the bearer information of that UE 2 (step S219). If the reconnection request is transmitted from the UE 2 that has failed to perform a handover, the bearer information included in the HO request for such UE 2 has been already saved.

If the bearer information of the UE 2 transmitting the reconnection request is saved, the communication control unit 103B continues the reconnection procedure using the saved bearer information (step S220).

If the bearer information on the UE 2 transmitting the reconnection request is not saved, the communication control unit 103B transmits a bearer information request to request the bearer information on such UE 2 to the telecommunications carrier apparatus 20 (step S221). The bearer information request includes connection information between the radio base station 10 managing a cell where the radio transmission is stopped and the telecommunications carrier apparatus 20. The connection information between the radio base station 10 managing the cell where the radio transmission is stopped and the telecommunications carrier apparatus 20 is included in a context saving request transmitted from such radio base station 10.

The telecommunications carrier apparatus 20 relates bearer information on bearers with the UE 2 (between the telecommunications carrier apparatus 20 and the radio base station 10, and between the radio base station 10 and the UE 2) to connection information between the UE 2 and the telecommunications carrier apparatus 20 and between the radio base station 10 and the telecommunications carrier apparatus 20, and manages the bearer and connection information.

When the bearer information request is received from the radio base station 10B, the telecommunications carrier apparatus 20 transmits a bearer information response including the bearer information related to the connection information included in that bearer information request to the radio base station 10B (step S222).

When the communication control unit 103B receives the bearer information response from the telecommunications carrier apparatus 20, the communication control unit 103B continues the reconnection procedure for the UE 2 transmitting the reconnection request by using the bearer information included in that bearer information response (step S223).

In the operation of the reconnection of the UE upon stopping the radio transmission to the cell 11, as explained with reference to FIG. 4, the process of step S217 (the reconnection request) corresponds to the process of step S101 in FIG. 3. Also, the process of step S221 in FIG. 4 (the bearer information request) corresponds to the process of step S104 in FIG. 3. In addition, the process of step S222 in FIG. 4 (the bearer information response) corresponds to the process of step S104 in FIG. 3. Also, the process of step S223 in FIG. 4 (continuing the reconnection procedure) corresponds to the processes of steps S118 and 119 in FIG. 3. Therefore, the processes from step S105 to step S116 and from step S120 to step S122 in FIG. 3 can be omitted. In this manner, in this exemplary embodiment, by transmitting the authentication code from the radio base station 10 managing a cell where the radio transmission is stopped to the radio base station 10 managing a peripheral cell, part of the processes where the radio base station 10 establishes the connection with the UE 2 can be omitted. Therefore, the connection can be established shortly to avoid a delay in providing communication service.

It is noted that the example where the communicating UE 2 requests a handover in the case of stopping radio transmission to the cell 11 is used for the explanation in this exemplary embodiment, but not restrictive. If the radio transmission to the cell 11 is stopped, the radio transmission to the cell 11 may be stopped after the context saving requests for communicating UE 2 and non-communicating UE 2 are transmitted to a radio base station 10 managing a peripheral cell. In this case, when the radio base station 10 managing the peripheral cell authenticates a reconnection request from UE 2 existing in the cell 11 where the radio transmission is stopped, the radio base station 10 acquires bearer information on such UE 2 from the telecommunications carrier apparatus 20 without determining whether or not to have saved the bearer information on such UE 2.

In this manner, according to this exemplary embodiment, the radio base station 10 comprises the determination unit 101 for determining whether or not to stop the radio transmission to the cell 11 managed by the radio base station 10, the communication unit 102 for communicating with other radio base stations 10 managing the peripheral cells and the telecommunications carrier apparatus 20, and the communication control unit 103. When it is decided to stop the radio transmission to the cell 11, the communication control unit 103 transmits the authentication code required for authentication of the reconnection request for the UE 2 existing in the cell 11 and establishing the connection with the radio base station 10 to a radio base stations managing a peripheral cell through the communication unit 102. Also, when the communication control unit 103 authenticates the reconnection request for the UE 2 based on the authentication code transmitted from another radio base station 10, the communication control unit 103 acquires the bearer information on the UE 2 from the telecommunications carrier apparatus 20 through the communication unit 102 and establishes a connection with the UE 2 based on the acquired bearer information.

Therefore, the radio base station 10 receiving the reconnection request from the UE 2 can establish the connection with UE 2 to provide communication service using that UE 2's authentication code received from another radio base station 10 and that UE 2's bearer information acquired from the telecommunications carrier apparatus 20. In addition, the amount of information transmitted and received between the radio base stations can be reduced to suppress increase in system loads because it is not necessary to exchange the bearer information between the radio base station managing the cell where the radio transmission is stopped and the radio base station managing a peripheral cell. Also, a connection with the UE 2 can be established quickly because the radio base station 10 receiving the reconnection request from the UE 2 can authenticate that reconnection request based on the authentication code transmitted from another radio base station. Therefore, the communication service can be provided for the UE 2 without delay.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. This application is based upon and claims the benefit of priority from Japanese patent application No. 2014-151347, filed on Jul. 25, 2014, the disclosure of which is incorporated herein in its entirety by reference.

REFERENCE SIGNS LIST

1 Mobile communication system
2 User equipment
10 Radio base station
101 Determination unit
102 Communication unit
103 Communication control unit

What is claimed is:

1. A radio base station, comprising:
a determination unit for determining whether or not to stop radio transmission to a cell managed by the radio base station;
a communication unit for communicating with another radio base station managing a peripheral cell of the cell and a management apparatus managing bearer information that is information on a bearer configured for user equipment; and
a communication control unit for transmitting an authentication code of user equipment existing in the cell and establishing a connection with the radio base station to a radio base station managing the peripheral cell through the communication unit upon decision of stopping the radio transmission to the cell, determining whether or not to authenticate a reconnection request based on an authentication code transmitted from another radio base station upon receipt of the reconnection request from user equipment, acquiring, from the management apparatus through the communication unit, bearer information on the user equipment having transmitted the reconnection request in a case of authenticating the reconnection request, and establishing a connection with the user equipment having transmitted the reconnection request based on the acquired bearer information.

2. The radio base station of claim 1,
wherein the communication control unit detects user equipment in a non-communication state in the user equipment existing in the cell and establishing a connection with the radio base station, transmits a handover request for communicating user equipment, including an authentication code and bearer information on the user equipment, to a radio base station managing a handover destination cell upon decision of stopping the radio transmission to the cell, and instructs the user equipment on a handover to a handover destination cell.

3. The radio base station of claim 2,
wherein the communication control unit requests a handover of the user equipment, following the communicating user equipment, in the non-communication state in ascending order according to length of time that has elapsed since the non-communication state started until a predetermined time passes after decision of stopping the radio transmission to the cell.

4. The radio base station of claim 2,
wherein the communication control unit transmits, to the radio base station managing the peripheral cell, an authentication code of user equipment that is not handed over when the predetermined time passes.

5. The radio base station of claim 3,
wherein the communication control unit transmits, to the radio base station managing the peripheral cell, the predetermined number of authentication codes of user equipment, in ascending order according to length of elapsed time after a non-communication state starts, in the user equipment that is in a non-communication state and is not handed over when the predetermined time passes.

6. The radio base station of claim 3,
wherein the communication control unit transmits, to the radio base station managing the peripheral cell, an authentication code of user equipment that has shorter length of elapsed time after a non-communication state starts than a threshold in the user equipment that is in the non-communication state and is not handed over when the predetermined time passes.

7. A method of controlling a radio base station, comprising:

determining whether or not to stop radio transmission to a cell managed by the radio base station;

transmitting an authentication code of user equipment existing in the cell and establishing a connection with the radio base station to a radio base station managing the peripheral cell upon decision of stopping the radio transmission to the cell; and determining whether or not to authenticate a reconnection request based on an authentication code transmitted from another radio base station upon receipt of the reconnection request from user equipment, acquiring bearer information on the user equipment having transmitted the reconnection request from a management apparatus managing bearer information that is information on a bearer configured for user equipment in a case of authenticating the reconnection request, and establishing a connection with the user equipment having transmitted the reconnection request based on the acquired bearer information.

* * * * *